(12) United States Patent
Files et al.

(10) Patent No.: US 11,643,848 B2
(45) Date of Patent: May 9, 2023

(54) AIRCRAFT PANEL SYSTEM, AIRCRAFT, AND METHOD OF OPERATING THE AIRCRAFT PANEL SYSTEM

(71) Applicant: The Boeing Company, Chicago, IL (US)

(72) Inventors: Joe Files, Arlington, WA (US); Adam A. Logue, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 1029 days.

(21) Appl. No.: 16/412,603

(22) Filed: May 15, 2019

(65) Prior Publication Data

US 2020/0362595 A1  Nov. 19, 2020

(51) Int. Cl.
| | |
|---|---|
| *E05B 63/00* | (2006.01) |
| *B64C 1/00* | (2006.01) |
| *E05F 1/00* | (2006.01) |
| *E05F 3/00* | (2006.01) |
| *E05B 63/22* | (2006.01) |
| *B64C 1/06* | (2006.01) |
| *E05F 3/20* | (2006.01) |
| *E05F 1/10* | (2006.01) |

(52) U.S. Cl.
CPC .............. *E05B 63/22* (2013.01); *B64C 1/066* (2013.01); *E05F 1/1008* (2013.01); *E05F 3/20* (2013.01); *E05Y 2900/502* (2013.01)

(58) Field of Classification Search
CPC .......... E05B 63/00; E05B 63/20; E05B 63/22; B64C 1/00; B64C 1/06; B64C 1/066; E05F 1/00; E05F 1/10; E05F 1/1008; E05F 3/00; E05F 3/20
See application file for complete search history.

(56) References Cited

U.S. PATENT DOCUMENTS

| | | | |
|---|---|---|---|
| 6,120,070 A * | 9/2000 | Myers ................... | E05B 65/006 292/254 |
| 2020/0277815 A1* | 9/2020 | Tendyra ................... | E05F 3/10 |
| 2021/0040786 A1* | 2/2021 | Heimbach ................ | E05F 5/08 |

* cited by examiner

*Primary Examiner* — Jacob T Minskey
*Assistant Examiner* — Matthew Hoover
(74) *Attorney, Agent, or Firm* — Perman & Green, LLP

(57) ABSTRACT

An aircraft panel system including a first panel, having a hinged coupling configured to couple the first panel to an aircraft structure, a second panel disposed adjacent to the first panel such that the first panel and the second panel together form cabin surface of an aircraft, and a latch mechanism configured to releasably couple the second panel to the aircraft structure, where the first panel is configured to pivot about the hinged coupling from a latched position to an actuation position to actuate the latch mechanism and cause a release of the second panel from the latch mechanism.

20 Claims, 14 Drawing Sheets

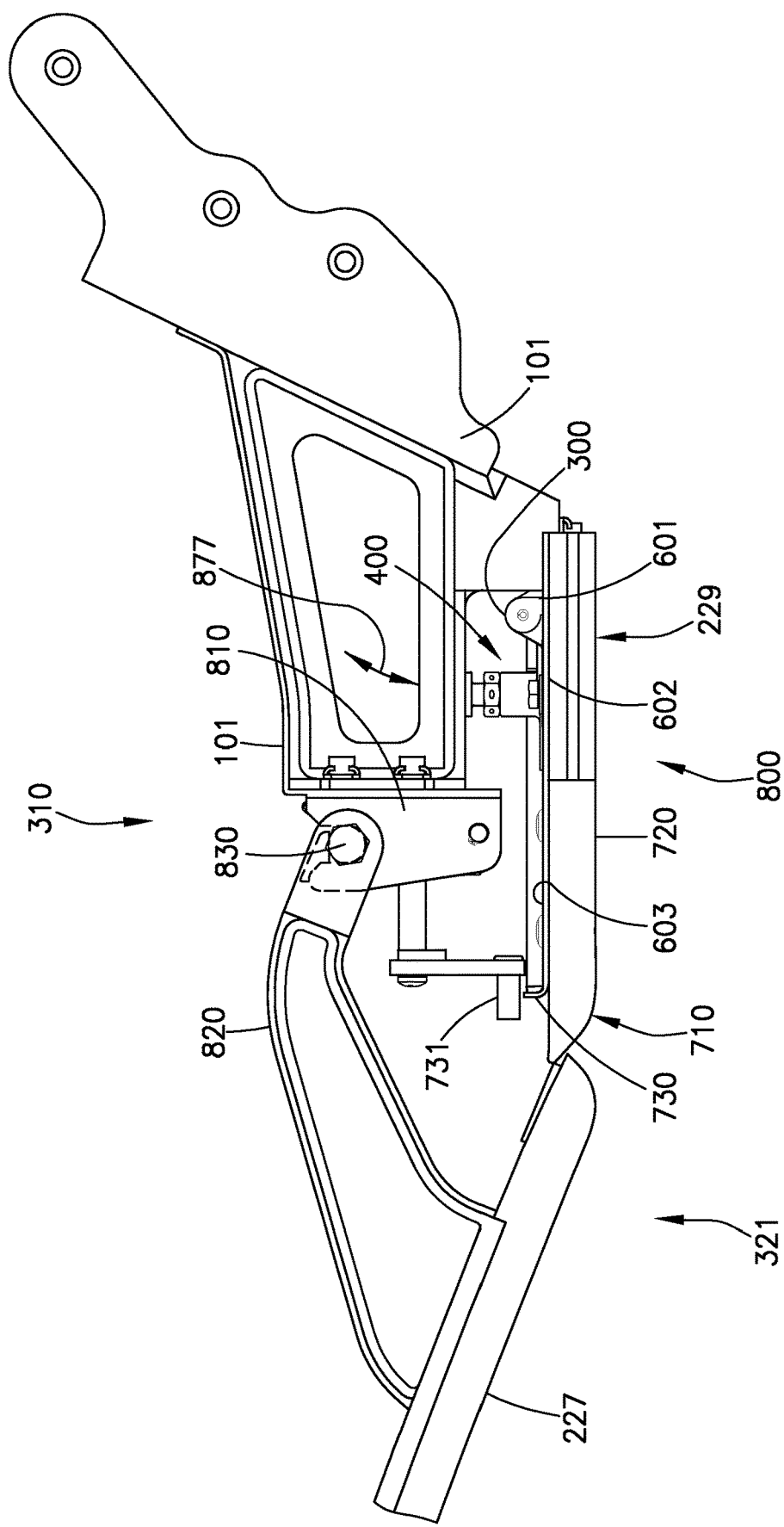

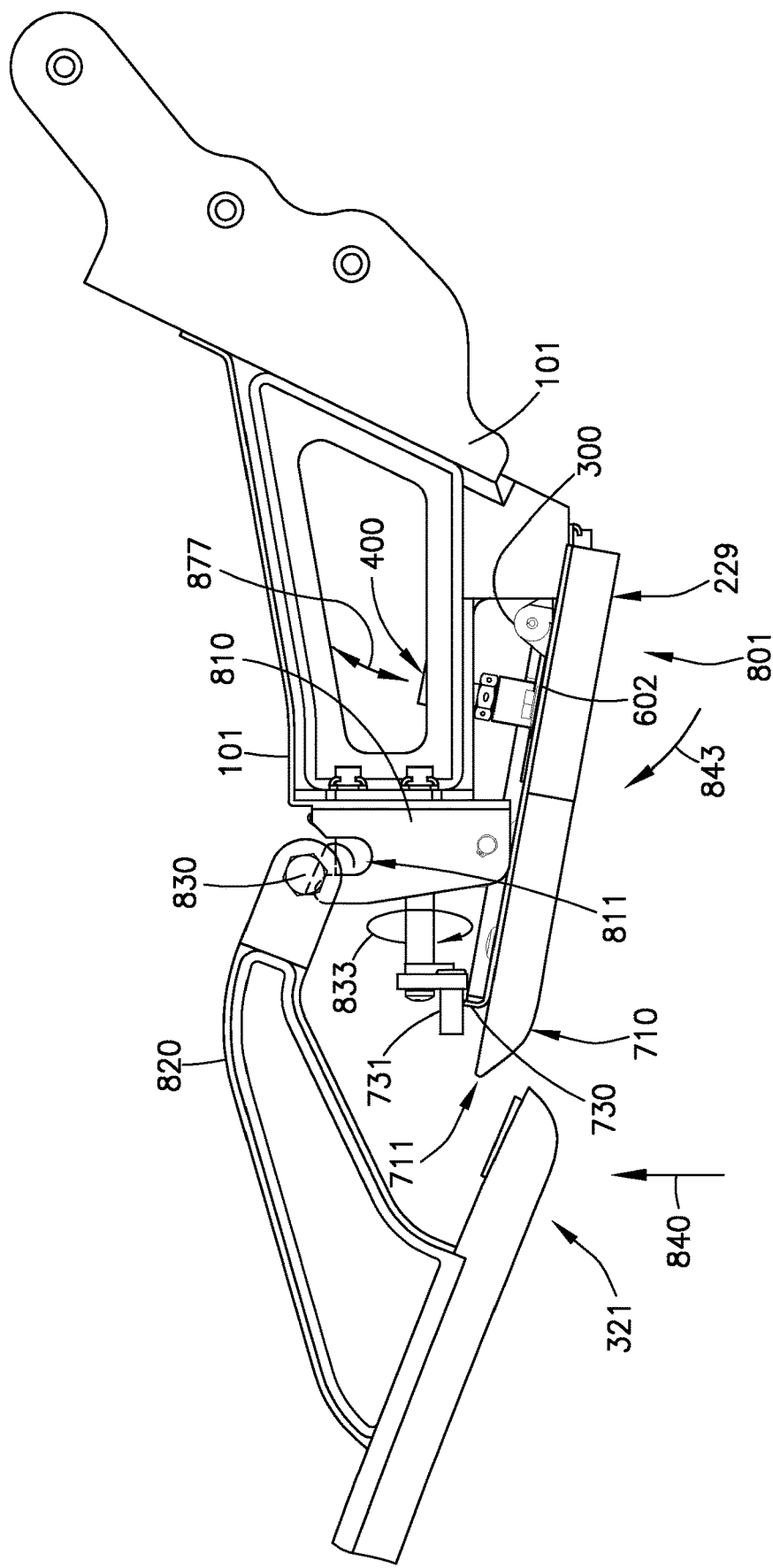

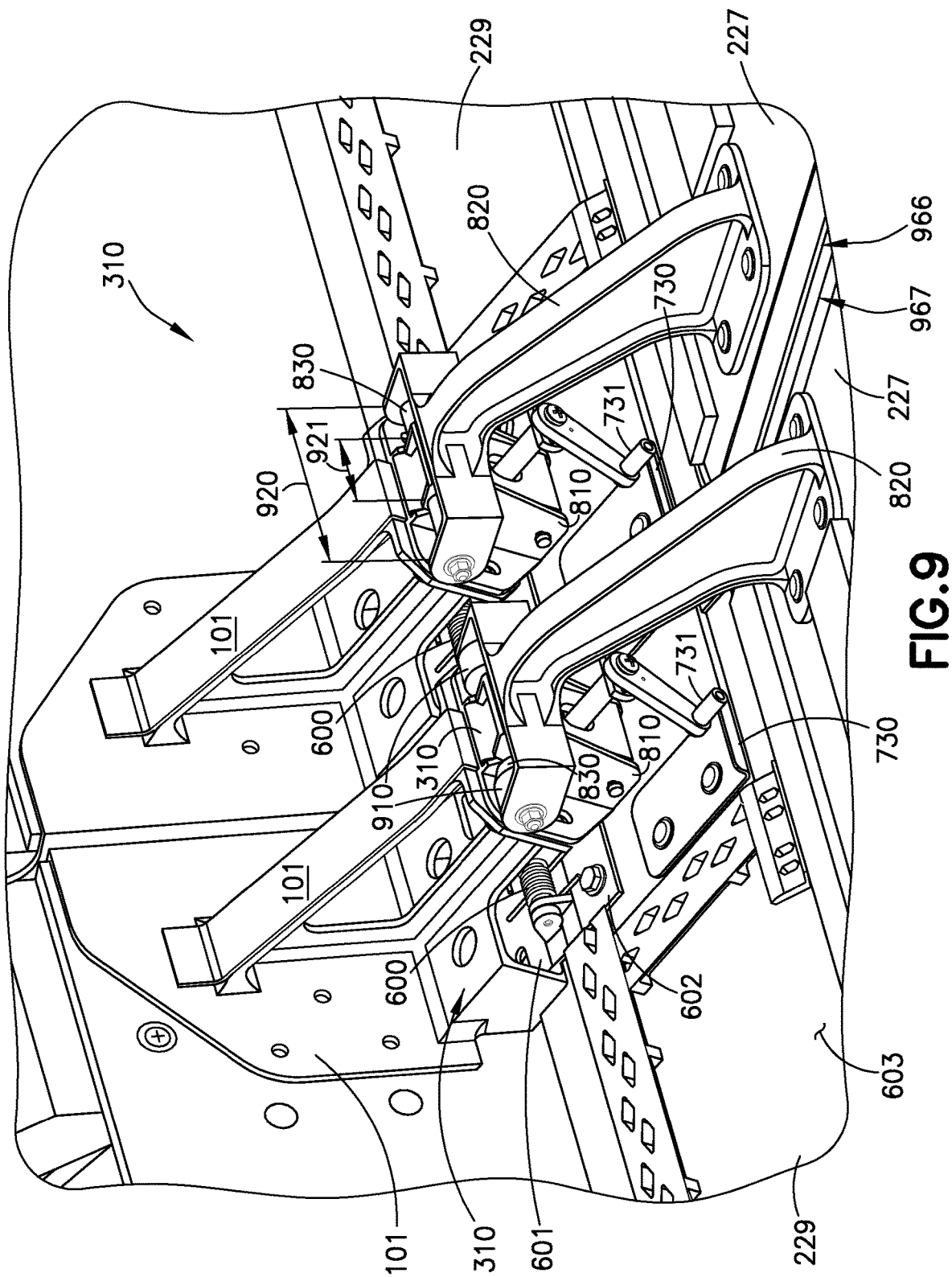

AIRCRAFT PANEL SYSTEM, AIRCRAFT, AND METHOD OF OPERATING THE AIRCRAFT PANEL SYSTEM

BACKGROUND

1. Field

The exemplary embodiments generally relate to aircraft panels and more particularly to aircraft panels with a lapped or shingled configuration.

2. Brief Description of Related Developments

Aircraft typically include fascia panels, such as within a cabin of the aircraft. The fascia panels are utilized to provide an aesthetically pleasing environment by concealing the numerous electrical and mechanical components of the aircraft from the passengers' view. To conduct maintenance or repair operations on the aircraft, it is often necessary to remove the fascia panels to access a component that is located behind the fascia panels.

In some instances, the fascia panels are installed adjacent to monuments or other panels (where one panels is overlapped by another in a manner similar to that of shingles on a house) that make it difficult to remove the fascia panels. More particularly, fascia panels located in the overhead sections of the aircraft are often configured to rotate downwardly to enable a technician to access the components located behind the fascia panels. However, when the fascia panels are installed adjacent the monuments, the monuments may interfere with the downward rotation of the fascia panels trapping the fascia panel and/or hindering removal of the fascia panels. In this instance, the fascia panel may only be capable of a partial opening or partial removal. In some instances the desired panel to be removed is overlapped and trapped by an adjacent panel that must also be removed before removing the desired panel. Generally to remove a trapped fascia panel the technician removes additional fascia panels adjacent the trapped fascia panel. The removal of the additional fascia panels enables removal of the trapped fascia panel so that the technician gains access to desired components. This removal of several fascia panels to gain access to a component that is behind only one of the fascia panels adds additional time and expense to a maintenance procedure.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to an aircraft panel system comprising: a first panel having a hinged coupling configured to couple the first panel to an aircraft structure; a second panel disposed adjacent to the first panel such that the first panel and the second panel together form cabin surface of an aircraft; and a latch mechanism configured to releasably couple the second panel to the aircraft structure, where the first panel is configured to pivot about the hinged coupling from a latched position to an actuation position to actuate the latch mechanism and cause a release of the second panel from the latch mechanism.

Another example of the subject matter according to the present disclosure relates to an aircraft comprising: a cabin; and an aircraft panel system disposed within the cabin, the aircraft panel system having a first panel having a hinged coupling configured to couple the first panel to an aircraft structure, a second panel disposed adjacent to the first panel such that the first panel and the second panel together form cabin surface of the aircraft, and a latch mechanism configured to releasably couple the second panel to the aircraft structure, where the first panel is configured to pivot about the hinged coupling from a latched position to an actuation position to actuate the latch mechanism and cause a release of the second panel from the latch mechanism.

Still another example of the subject matter according to the present disclosure relates to a method of operating an aircraft panel system, the method comprising: pressing a free end of a first panel, that is disposed adjacent a second panel such that the second panel overlaps the first panel, away from the second panel so that the first panel pivots from a latched position to an actuation position about a hinged coupling that couples the first panel to an aircraft structure; and actuating a latch mechanism with the first panel to cause a release of the second panel from the latch mechanism, where when latched the latch mechanism couples the second panel to the aircraft structure.

BRIEF DESCRIPTION OF THE DRAWINGS

Figure 1:
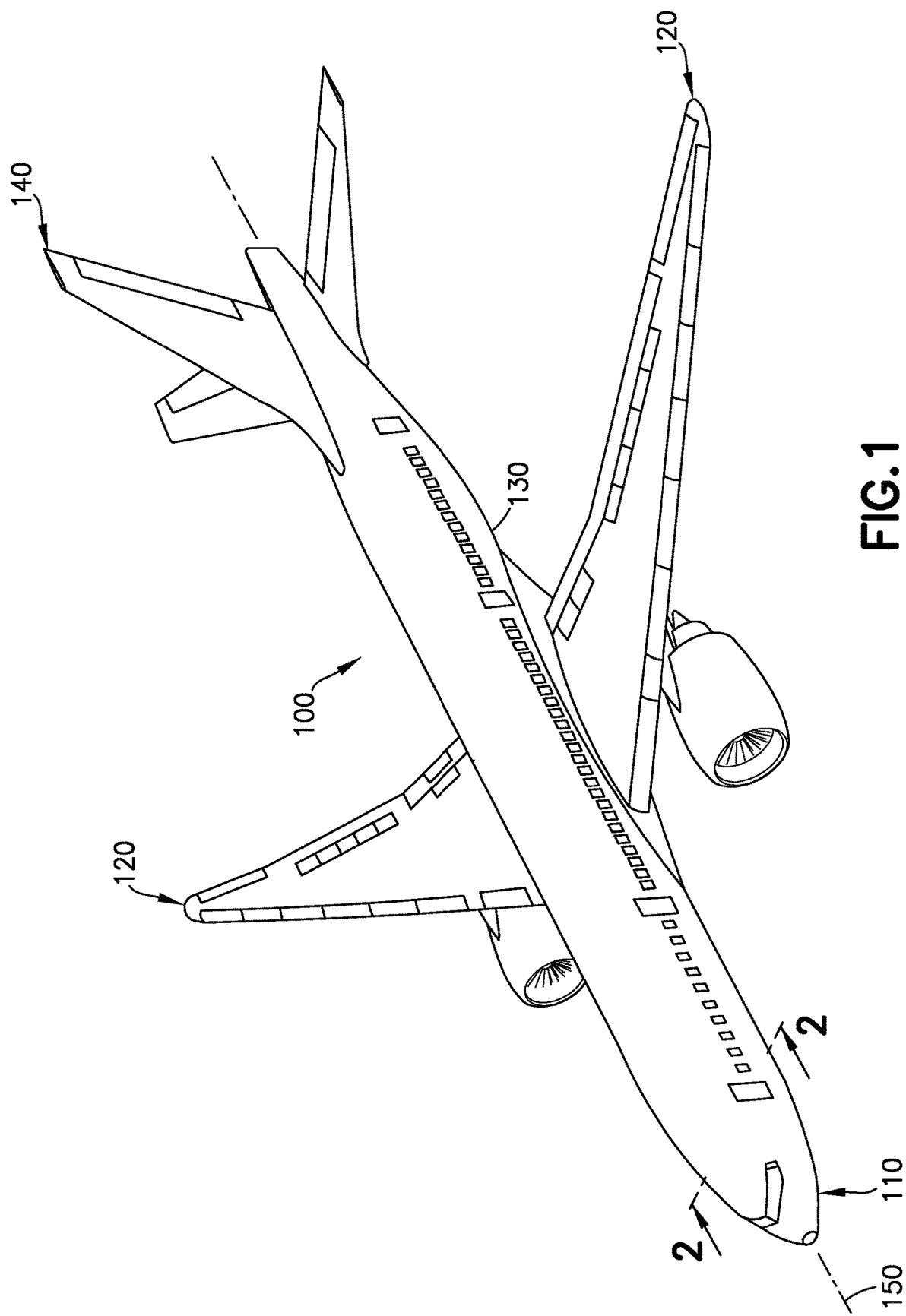
Figure 2:
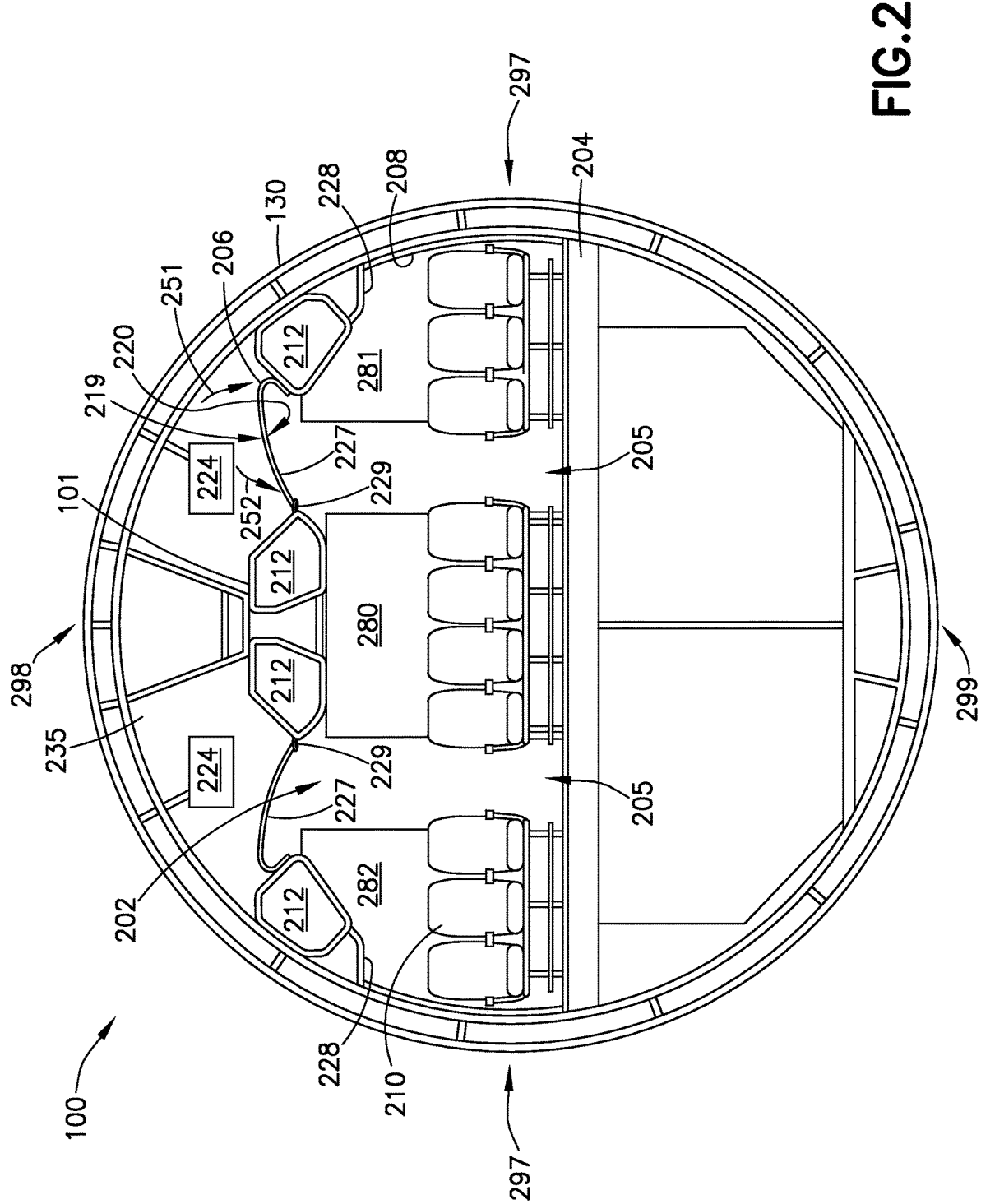
Figure 3:
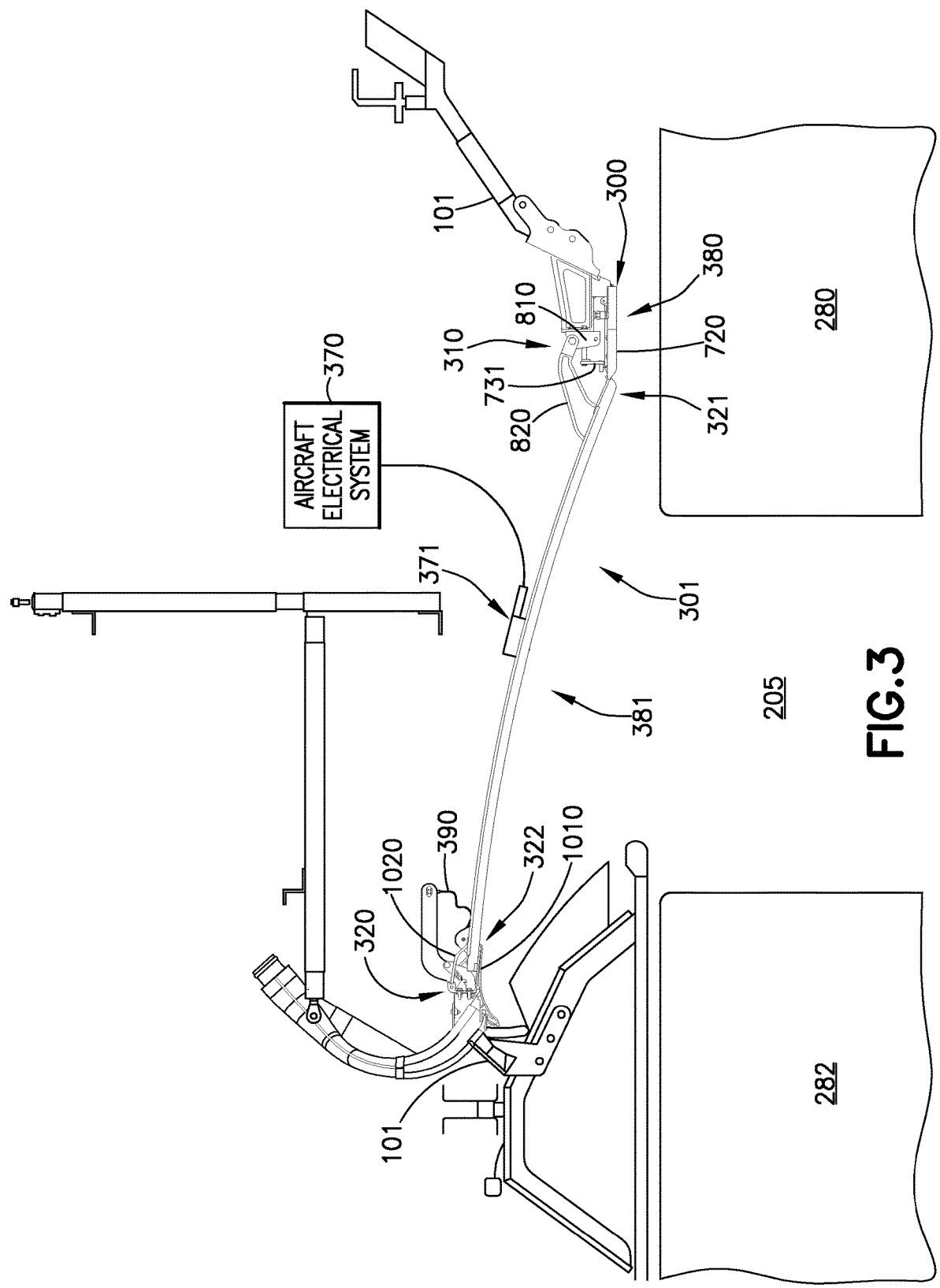
Figure 4:
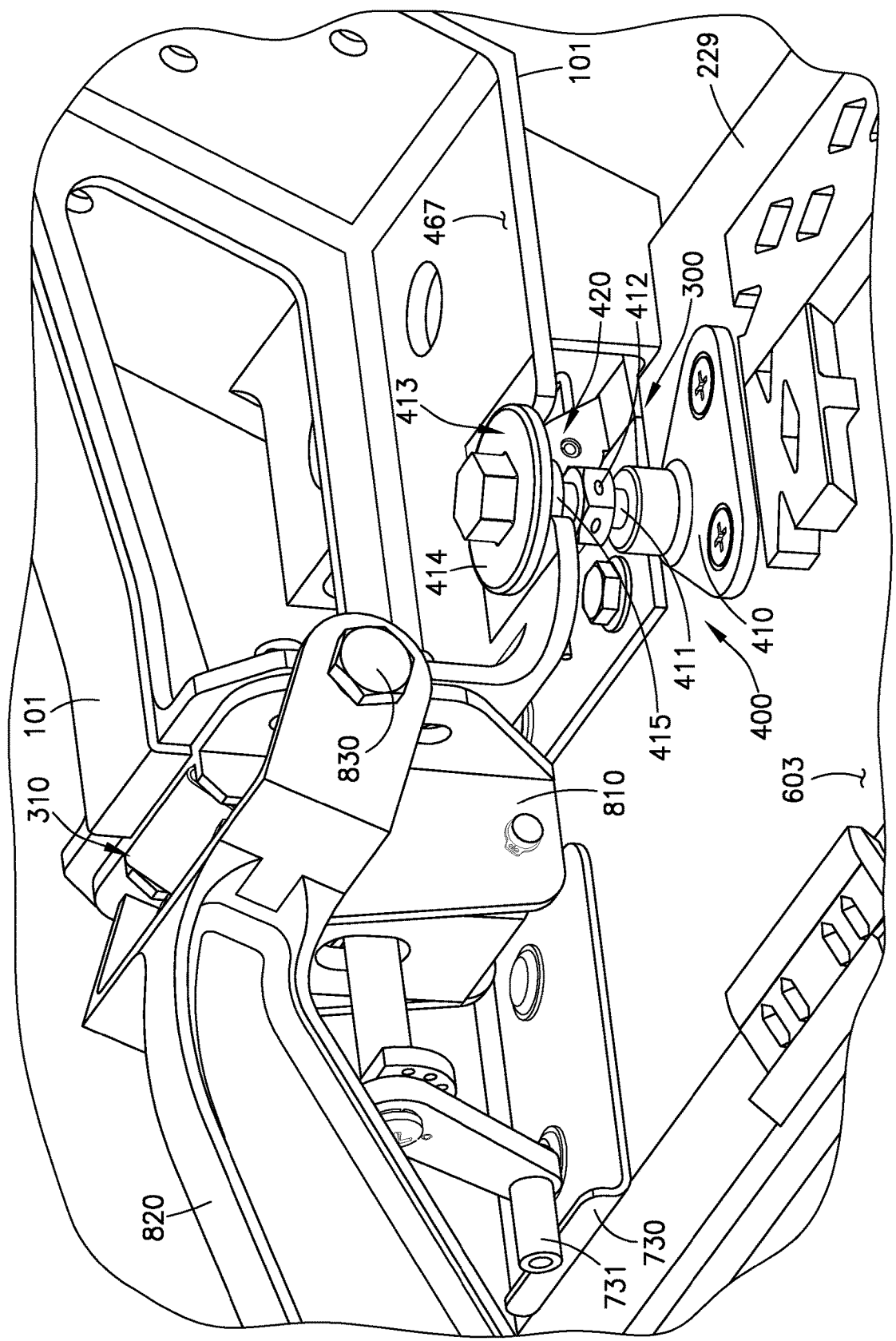
Figure 5:
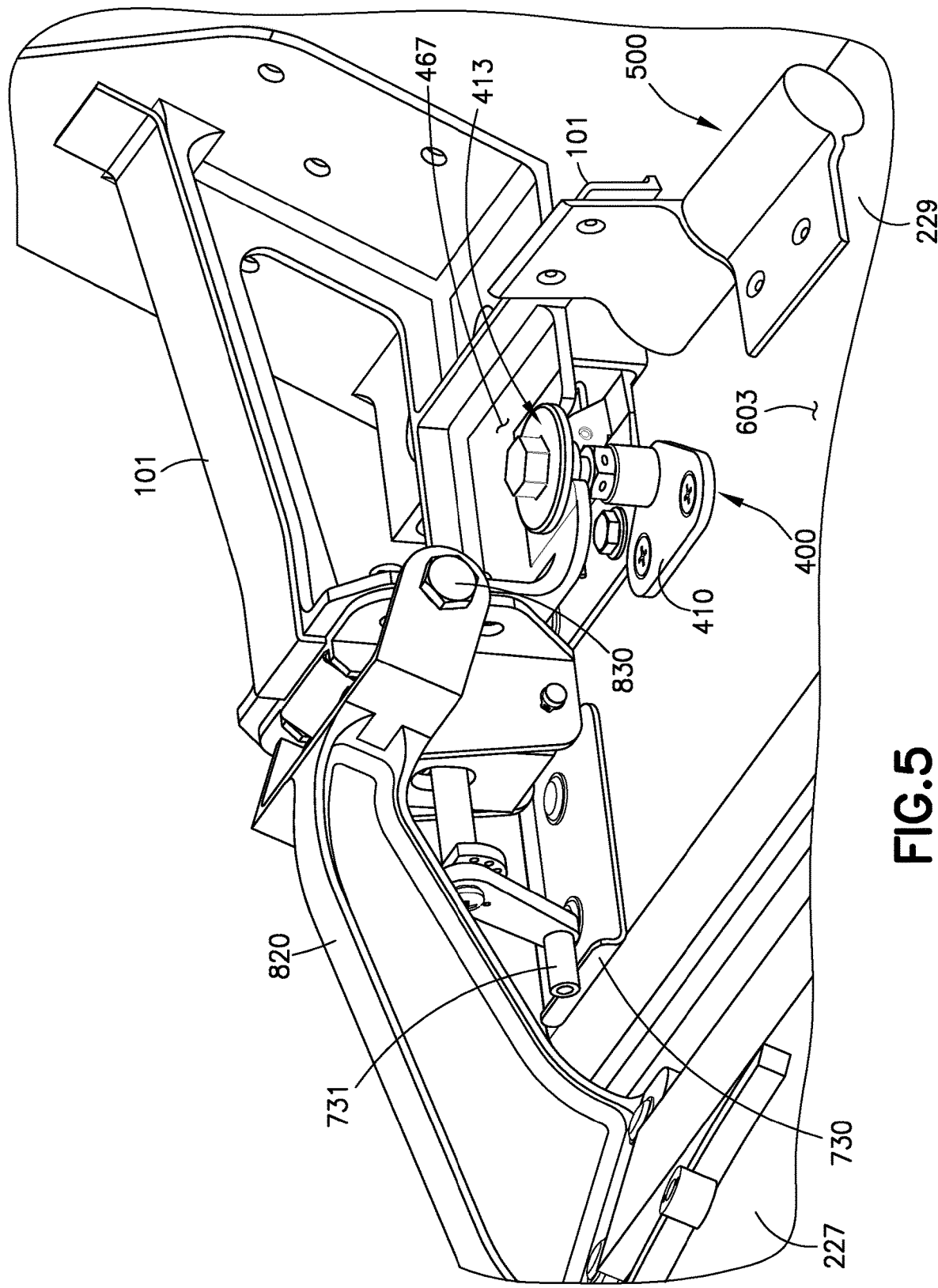
Figure 6:
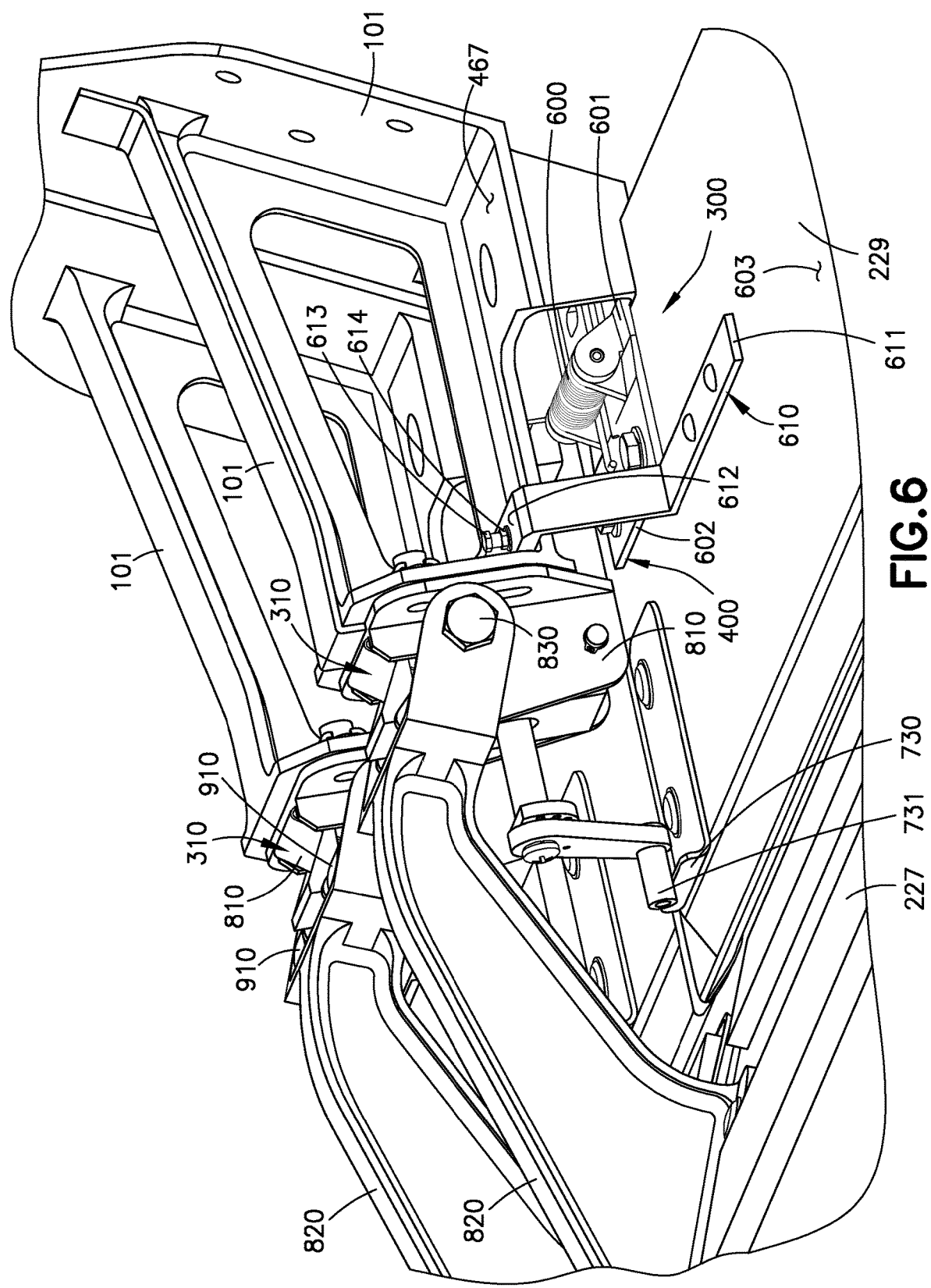
Figure 7:
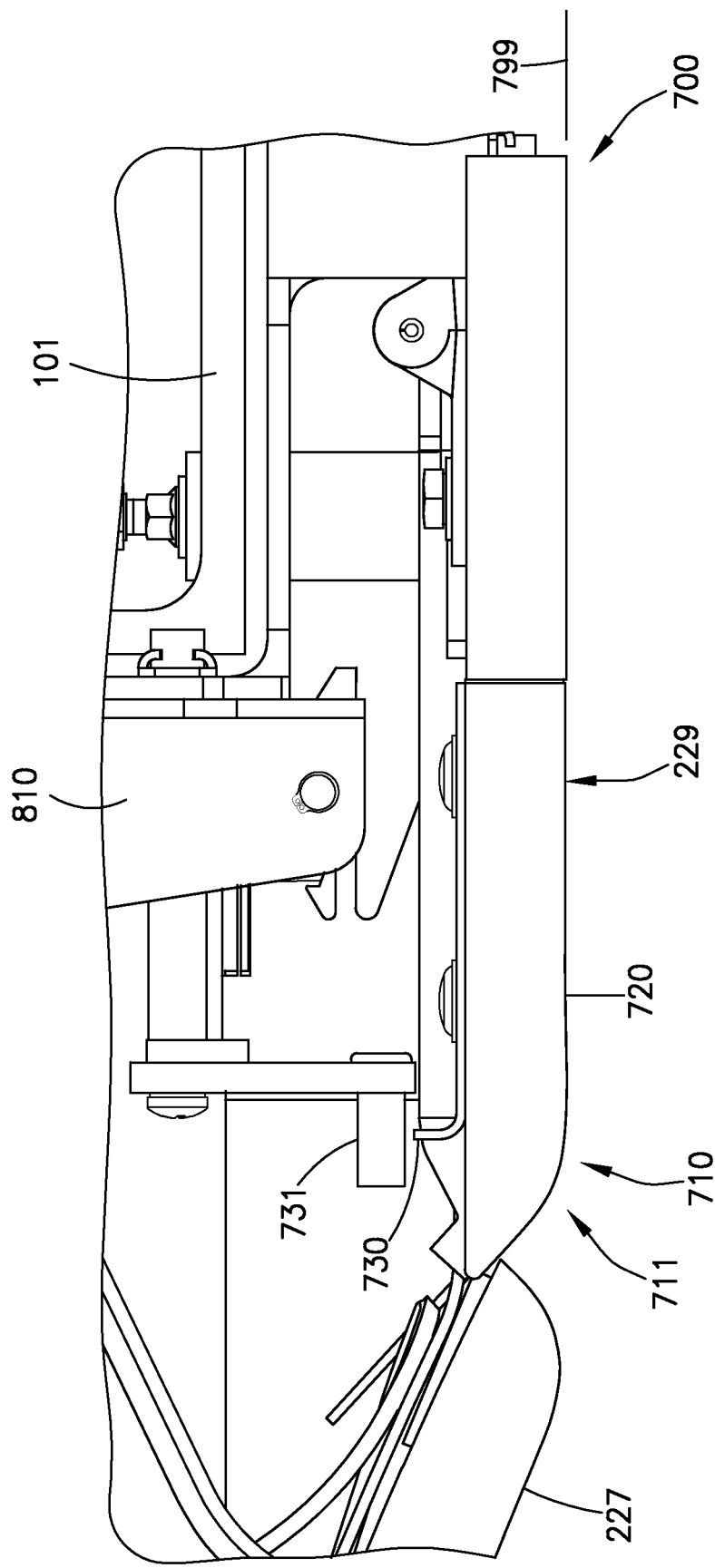
Figure 8C:
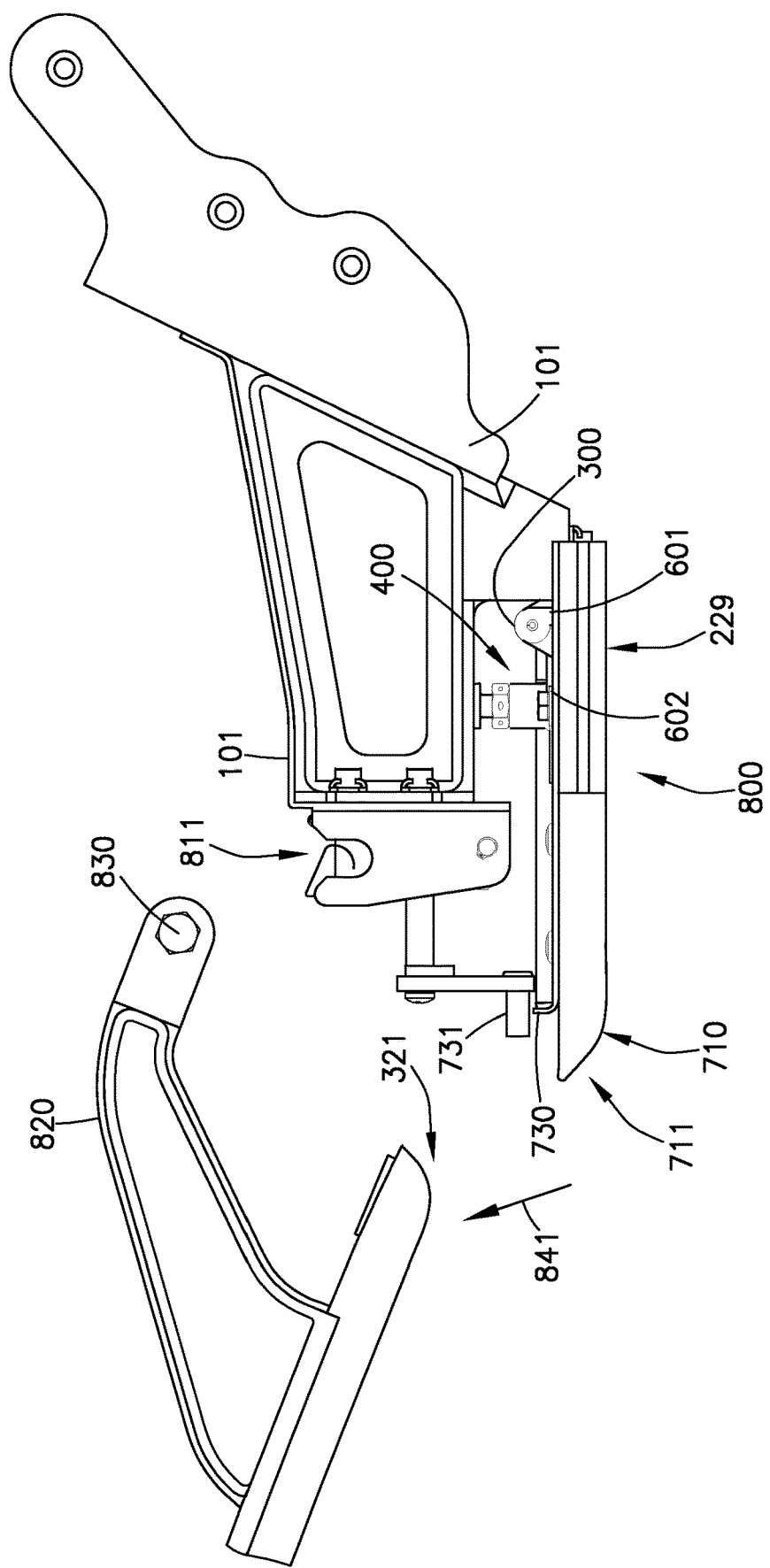
Figure 10:
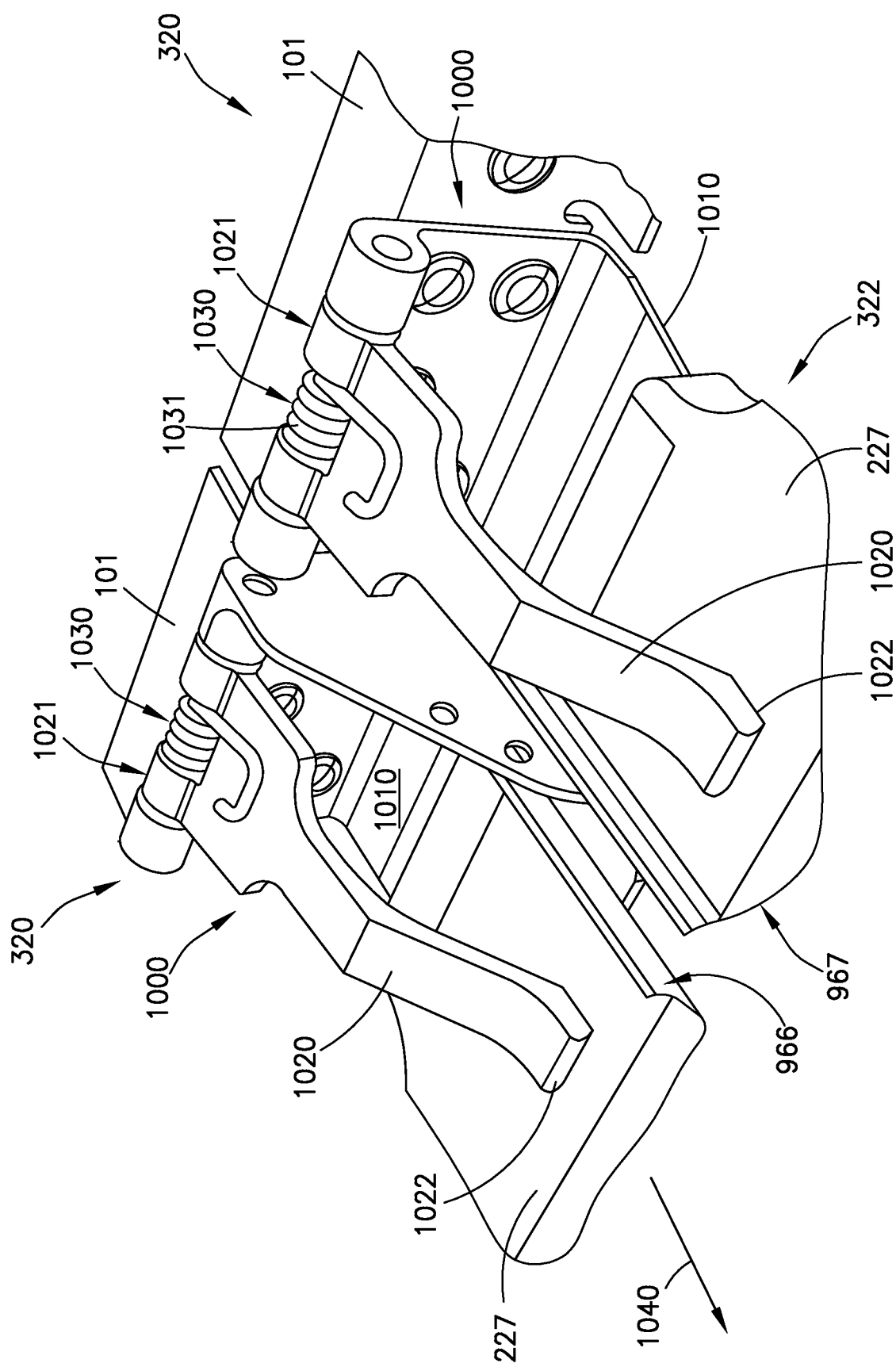
Figure 11:
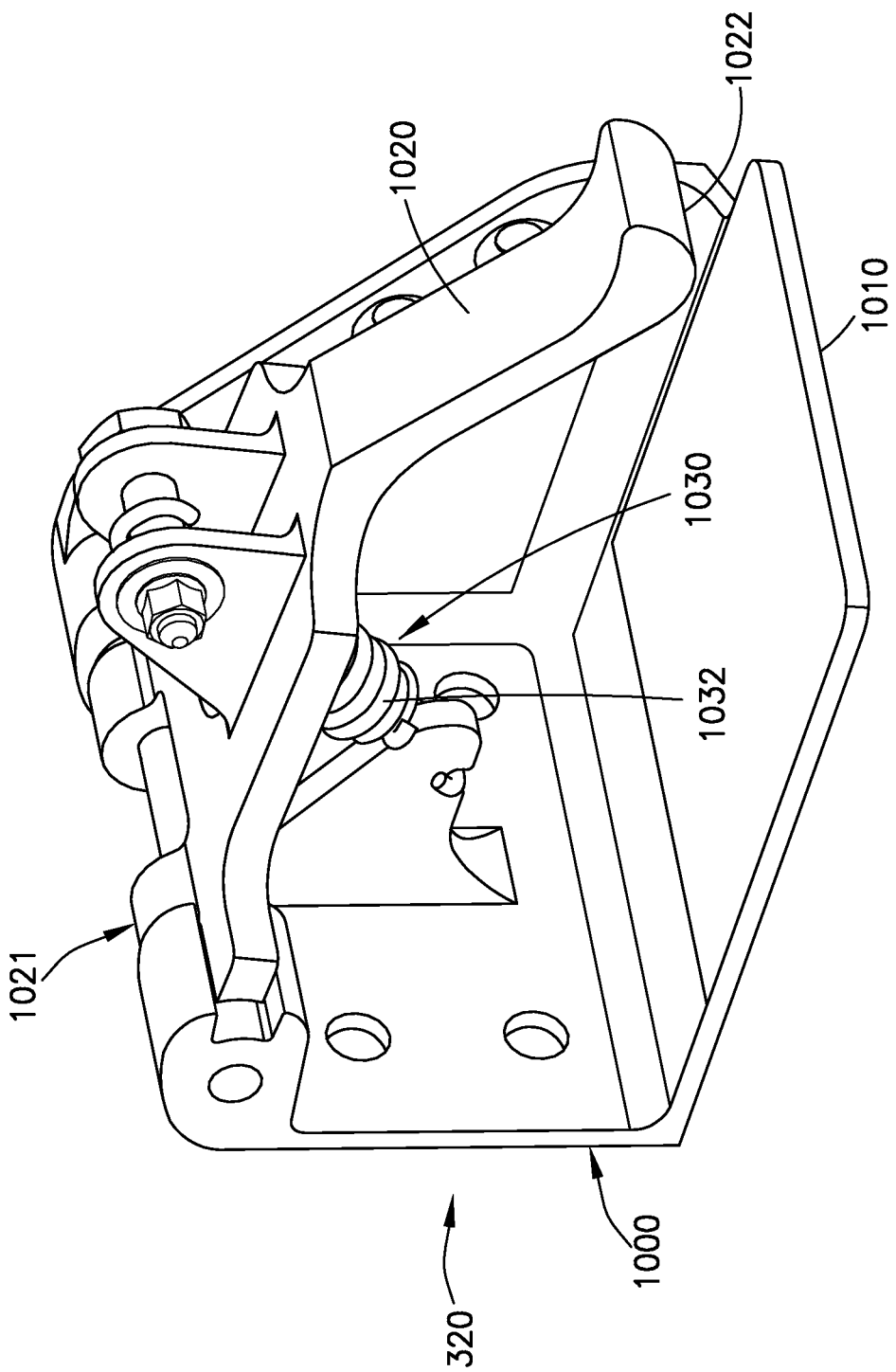
Figure 12:
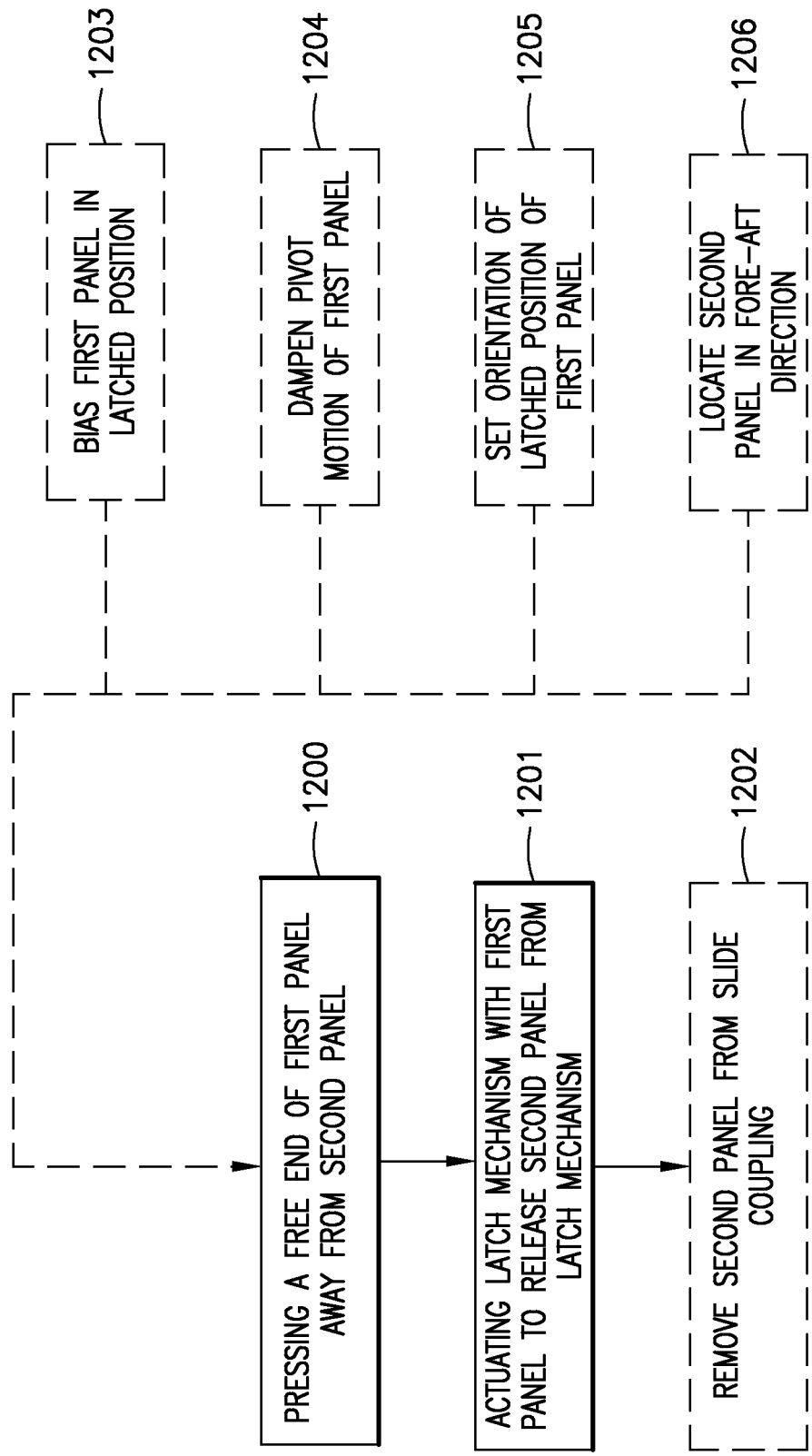

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic perspective illustration of an aircraft including an aircraft panel system in accordance with aspects of the present disclosure;

FIG. 2 is a schematic cross-section illustration of a the aircraft of FIG. 1 along section line 2-2 showing a portion of an aircraft panel system in accordance with aspects of the present disclosure;

FIG. 3 is a schematic illustration, along a fore-aft or longitudinal direction of the aircraft of FIG. 1, of a portion of the aircraft panel system of FIG. 2 in accordance with aspects of the present disclosure;

FIG. 4 is a perspective illustration of a portion of the aircraft panel system of FIG. 2 in accordance with aspects of the present disclosure;

FIG. 5 is a perspective illustration of the portion of the aircraft panel system of FIG. 2 in accordance with aspects of the present disclosure;

FIG. 6 is a perspective illustration of a portion of the aircraft panel system of FIG. 2 in accordance with aspects of the present disclosure;

FIG. 7 is a schematic illustration, along a fore-aft or longitudinal direction of the aircraft of FIG. 1, of a portion of the aircraft panel system of FIG. 2 in accordance with aspects of the present disclosure;

FIGS. 8A, 8B, and 8C are schematic illustrations showing removal of a panel of the aircraft panel system of FIG. 2 at various stages of removal in accordance with aspects of the present disclosure;

FIG. 9 is a perspective illustration of the portion of the aircraft panel system of FIG. 2 in accordance with aspects of the present disclosure;

FIG. 10 is a perspective illustration of the portion of the aircraft panel system of FIG. 2 in accordance with aspects of the present disclosure;

FIG. 11 is a perspective illustration of the portion of the aircraft panel system of FIG. 2 in accordance with aspects of the present disclosure; and FIG. 12 is an exemplary flow diagram of for a method in accordance with aspects of the present disclosure.

DETAILED DESCRIPTION

Referring to FIGS. 1 and 2, an aircraft 100 is illustrated. The aircraft 100 includes a nose 110, wings 120, a fuselage 130, and a tail 140. The fuselage 130 is elongated along a fore-aft direction or longitudinal axis 150 of the aircraft 100. The fuselage 130 includes a floor 204, a ceiling 206, and aesthetic fascia walls 208 which define an aircraft cabin 202 (e.g., generally inclusive of passenger, crew, and/or cockpit portions) of the aircraft 100. Seats 210 may be arranged on the floor 204 so that aisles 205 are disposed between groupings of the seats 210, where the aisles 205 extend in the fore-aft direction of the aircraft 100. At least the ceiling 206 includes an aircraft panel system 219 having aesthetic fascia panels 220. The aspects of the present disclosure provide the aesthetic fascia panels 220 of the ceiling 206 with a first panel 229 that can be employed to mechanically release a second panel 227, where the second panel 227 would otherwise be trapped from complete removal, from an aircraft structure 101 of the aircraft 100. For example, the first panel 229 is pivotally coupled to the aircraft structure 101 so that a free end 711 (FIG. 7) of the first panel 229 pivots towards a top 298 of the aircraft 100. The free end 711 of the first panel 229 is biased towards a bottom of the aircraft so that the first panel 229 is depressed (e.g., relative to adjacent aesthetic fascia panels 220 of the ceiling 206) against the bias to pivot the free end 711 towards the top 298 of the aircraft 100. Pivoting the free end 711 towards the top 298 of the aircraft 100 and away from the second panel 227 releases a latch on the second panel 227 to enable the removal of the second panel 227 from the aircraft structure 101. The aspects of the present disclosure provide for a release of the second panel 227 in an upward direction (e.g., towards the top 298 of the aircraft 100) that is unhindered by monuments 280, 281, 282 or other structure of the aircraft so that only a single aesthetic fascia panel, corresponding with a location of a desired component to be serviced, need be removed (i.e., without removal of adjacent aesthetic fascia panels) for servicing the desired component of the aircraft 100.

Removal of only the aesthetic fascia panel in front of which a desired component is located (or a corresponding number of necessary aesthetic fascia panels if the component is behind several panels) decreases time required for a technician to access and repair component(s) located behind the aesthetic fascia panel. While the aspects of the present disclosure are described herein with respect to the aesthetic fascia panels 220 of the ceiling 206, it should be understood that the aspects of the present disclosure may be applied equally to the panels of the aesthetic fascia walls 208 or any other suitable panels disposed at any suitable location(s) of the aircraft 100 (such as the floor 204 or other structure). In addition, while the aspects of the present disclosure are described herein with respect to the aircraft 100 (e.g., a fixed wing commercial aircraft) illustrated in FIGS. 1 and 2, the aspects of the present disclosure may be applied equally to any suitable fixed or rotary wing aircraft, lighter-than-air aircraft, aerospace vehicle (intended for both atmospheric and non-atmospheric flight), space vehicle (intended for non-atmospheric flight), maritime vessel, or automotive/ground-based vehicle that may otherwise have removable panels that are trapped from complete removal.

Referring to FIGS. 2, 3, 7, and 8A-8C, the aircraft panel system 219 is disposed within the aircraft cabin 202, and includes a first panel 229, a second panel 227, and a latch mechanism 310 configured to releasably couple the second panel 227 to the aircraft structure 101. The first panel 229 comprises a cove panel 380 (e.g., is disposed between the second panel 227 and the aesthetic fascia walls 208) and the second panel 227 comprises an aisle ceiling panel 381 (e.g., is disposed above a respective aisle 205). The first panel 229 has a hinged coupling 300 configured to couple the first panel 229 to an aircraft structure 101. The second panel 227 is disposed adjacent to the first panel 229 such that the first panel 229 and the second panel 227 together form cabin surface 301 of the aircraft 100. The first panel 229 is configured to pivot about the hinged coupling 300 from a latched position 800 to an actuation position 801 to actuate the latch mechanism 310 and cause a release of the second panel 227 from the latch mechanism 310. For example, the first panel 229 has a first-panel inboard end 700 adjacent the hinged coupling 300 and a first-panel outboard end 710 adjacent the second panel 227. The first panel 229 is configured such that the first-panel outboard end 710 pivots away from the second panel 227 to actuate the latch mechanism 310. In one aspect, the first-panel outboard end 710 (where the free end 711 of the first panel 229 comprises the first-panel outboard end 710) of the first panel 229 pivots towards a top 298 of the aircraft 100; however, in other aspects the first-panel outboard end 710 may pivot towards a bottom 299 of the aircraft 100 or towards one of the lateral sides 297 of the aircraft 100 depending on whether the first panel 229 and the second panel 227 form aesthetic fascia walls 208 or floor 204 of the aircraft 100. Pivoting of the first panel 229 relative to the second panel releases the second panel 227 from the latch mechanism 310 substantially without tools and provides for the first panel 229 remaining in place during removal and installation of the second panel 227.

As can be seen in FIG. 2, the second panel 227 may be disposed above one or more monuments 280-282 and/or luggage compartments 212 of the aircraft cabin 202. The monuments 280-282 may be any suitable monuments such as, galleys, closets, lavatories, and passenger class partitions. Removal of the second panel 227 through a downward rotation of a second-panel outboard end 322 of the second panel 227 in direction 251 may be hindered or blocked by one or more of the monuments 280-282 and/or luggage compartments 212. Similarly, a downward rotation of a second-panel inboard end 321 in direction 252 may be hindered or blocked by an overlapping of the first panel 229 with the second panel 227. For example, the second panel 227 extends over a display surface 720 of the first panel 229. In the aspects of the present disclosure the lapped panel (e.g., the first panel 229 over which a portion of the second panel 227 is disposed) itself is the actuator for a hidden latch (e.g., latch mechanism 310) disposed behind both the first panel 229 and the second panel 227 so as to eliminate direct access to the latch mechanism 310. The aspects of the present disclosure provide for a preservation of aesthetics and architecture within the aircraft cabin 202 while providing quick and ready maintenance access. The aspects of the present disclosure provide for the upward rotation of the second-panel outboard end 322, away from the first panel 229, so that the second-panel inboard end 321 may be released and the second panel 227 may be removed without hindrance of the monuments 280-282, luggage compartments 212, and/or the first panel 229.

While the aspects of the present disclosure illustrate the first panel 229 as being inboard of the second panel 227, in other aspects, the first panel 229 may be outboard of the second panel 227. As such reference to inboard and outboard directions is used herein for convenience of description and it should be understood that the first panel 229 and the second panel 227 may have any suitable directional orientation relative to each other.

Referring to FIGS. 3, 5, 6, and 8A-8C, the first panel 229 is cantilevered from the aircraft structure 101 through the hinged coupling 300 to provide for pivoting movement of the first panel 229. For example, the hinged coupling 300 comprises a first leg 601 that is cantilevered from the aircraft structure 101 and a second leg 602 that is coupled to a coupling surface 603 of the first panel 229. The hinged coupling 300 comprises a panel biasing member 600 that biases the first panel 229 in the latched position 800. The panel biasing member 600 may be a torsion spring or any other suitable biasing member that maintains the first panel 229 in the latched position 800. Biasing the first panel 229 in the latched position 800 maintains a predetermined distance between the first panel 229 and the latch mechanism 310 so as to substantially prevent undesired actuation of the latch mechanism 310. In one aspect, the first panel 229 comprises a damper 500 configured to dampen pivoting motion of the first panel 229 about the hinged coupling 300. The damper 500 may also substantially prevent undesired actuation of the latch mechanism 310 resulting from sudden rotation of the first panel 229 about the hinged coupling 300, such as from turbulence or pressure changes within the aircraft 100. For example, the damper 500 may be an air and/or oil damper configured in any suitable manner to allow controlled rotation of the first panel 229 by a technician while substantially preventing uncontrolled rapid rotation of the first panel 229. In one aspect the damper 500 may be incorporated into the hinged coupling 300 so that the hinged coupling 300 and damper 500 form a unitary member.

Referring to FIGS. 2, 4, 6, and 8A-8C, the aircraft panel system 219 comprises an over-travel stop 400 coupled to one or more of the first panel 229 and the aircraft structure 101, the over-travel stop 400 being configured to set an orientation of the latched position 800 of the first panel 229. For example, the over-travel stop 400 may be adjusted so that a display surface 720 (FIG. 7) of adjacent first panels 229 (see FIG. 9) are substantially aligned with each other in a common plane 799 (FIG. 7). In one aspect, referring to FIG. 4, the over-travel stop 400 comprises a base 410 that is coupled to the coupling surface 603 of first panel 229 in any suitable manner (e.g., chemical and/or mechanical fasteners). A threaded rod 411 extends from the base 410 so as to form a stanchion. A flanged nut 413 is threadably disposed on the threaded rod 411. A lock nut 412 may be provided to lock the flanged nut 413 at a set location along the threaded rod 411. The flanged nut 413 includes a flanged portion 414 and a body portion 415 that extends from the flanged portion 414 so as to threadably engage the threaded rod 411. The body portion 415 of the flanged nut 413 is disposed within a channel 420 of the aircraft structure 101, where the channel 420 has a width greater than a diameter of the body portion 415 but less than a diameter of the flanged portion 414. The channel 420 is sized so that the flanged nut 413 moves within the channel 420 along an arcuate path (877; FIGS. 8A and 8B) without obstruction while the first panel 229 is pivoted about the hinged coupling 300 between the latched position 800 and the actuation position 801 for actuating the latch mechanism 310. As the first panel 229 is biased to the latched position 800 the flanged portion 414 contacts stop surface 467 of the aircraft structure 101 adjacent the channel 420 to counter the bias exerted on the first panel 229 by the hinged coupling 300 and to arrest movement of the first panel 229 at the set orientation. Alignment of the display surface 720 of the first panel 229 with the common plane 799 may be adjusted by turning the flanged nut 413.

In another aspect, still referring to FIGS. 2, 4, 6, and 8A-8C and particularly to FIG. 6, the over-travel stop comprises a bracket 610 that has a first end 611 coupled to the coupling surface 603 of first panel 229 in any suitable manner (e.g., chemical and/or mechanical fasteners). A second end 612 of the bracket 610 extends over the stop surface 467 of the aircraft structure 101. A bolt 613 is threadably coupled to the second end 612 so as to extend through the second end 612 for engagement with the stop surface 467. A lock nut 614 may be provided to lock the bolt 613 at a set location relative to the second end 612. The bolt 613 is separated from the stop surface 467 as first panel 229 is pivoted about the hinged coupling 300 so as to move between the latched position 800 and the actuation position 801 for actuating the latch mechanism 310. As the first panel 229 is biased to the latched position 800 the bolt 613 contacts stop surface 467 of the aircraft structure 101 to counter the bias exerted on the first panel 229 by the hinged coupling 300 and to arrest movement of the first panel 229 at the set orientation. Alignment of the display surface 720 of the first panel 229 with the common plane 799 may be adjusted by turning the bolt 613.

Referring to FIGS. 2, 7, 8A-8C, and 9, the latch mechanism 310 comprises a first latch portion 810 and a second latch portion 820. The first latch portion 810 is coupled to the aircraft structure 101 and includes a receiver mechanism 811. The receiver mechanism 811 comprises a release arm 731. The second latch portion 820 is coupled to the second panel 227 and includes a striker 830. The receiver mechanism 811 is configured to receive and releasably retain the striker 830 of the second latch portion 820. The latch mechanism 310 couples the second-panel inboard end 321 to the aircraft structure 101.

The first panel 229 comprises a cam member 730 that is configured to actuate the release arm 731, when the first panel is pivoted to the actuation position 801 (see FIG. 8B), causing the release of the second panel 227 from the latch mechanism 310. For example, the cam member 730 may extend from the coupling surface 603 of the first panel 229 towards the release arm 731. As the first panel 229 is pivoted from the latched position 800 to the actuation position 801, the cam member 730 contacts the release arm 731 and causes rotation of the release arm 731. The release arm 731 may be predisposed at an angle relative to the cam member 730 (as shown in FIGS. 4, 5, and 9) to facilitate a predetermined direction of rotation 833 of the release arm 731. The release arm 731 is configured to actuate the latch mechanism 310 through a rotation of the release arm 731 by the cam member 730 in any suitable manner for releasing the striker 830 of the second latch portion 820 from the receiver mechanism 811 of the first latch portion 810.

Each second panel 227 incudes a fore-end 966 and an aft-end 967 (again the expressions fore and aft being used for convenience of description relative to panel orientation within the aircraft 100). The aircraft panel system 219 includes a latch mechanism 310 disposed at each of the fore-end 966 and aft-end 967 for coupling the second panel 227 to the aircraft structure 101. The striker 830 of the latch mechanism 310 at, for example, the aft-end 967 includes locating members 910 that engage the second latch portion 820 to locate the second panel 227 in a fore-aft direction of the aircraft 100. The striker 830 of the latch mechanism 310 at, for example, the fore-end 966 may lack locating members 910 so that the striker 830 at the fore-end of the second panel 227 may "float" (e.g., move freely in a fore-aft direction while engaged with the receiver mechanism 811, which fore-aft movement is constrained by engagement of the locating members 910 with the second latch portion 820) within the forward located latch mechanism 310. Positively locating only one end the second panel 227 in the fore-aft direction provides for reduced locating tolerances between the aircraft panel system 219 and the aircraft structure which reduces cost of the aircraft and decreases assembly time of the aircraft. To provide for the "floating" of the striker 830 at the fore-end of the second panel 227, the striker 830 has a striker length 920 that is greater than a receiver length 921 of the receiver mechanism 811.

Referring to FIGS. 2, 10 and 11, the aircraft panel system 219 comprises a slide coupling 320 configured to couple the second-panel outboard end 322 to the aircraft structure 101. As with the latch mechanism 310, a slide coupling 320 may be disposed at each of the fore-end 966 and the aft-end 967 of the second panel 227. In other aspects, additional latch mechanisms 310 and slide couplings 320 may be disposed between the fore-end 966 and the aft-end 967 of the second panel 227 depending on a fore-aft length of the second panel 227. The slide coupling 320 comprises a base bracket 1000 and a finger member 1020. The base bracket 1000 is configured for coupling with the aircraft structure 101 (e.g., with any suitable mechanical and/or chemical fasteners) and has a panel support 1010 configured to support the second-panel outboard end 322 of the second panel 227. The finger member 1020 has a knuckle 1021 pivotally coupled to the base bracket 1000, and a tip 1022 that extends from the knuckle 1021 so that the tip 1022 contacts the second panel 227. A finger biasing member 1030 is coupled to both the base bracket 1000 and the finger member 1020 so as to bias the tip 1022 towards the panel support 1010 and against the second panel 227. Biasing the tip against the panel support 1010 and against the second panel 227 holds the second panel 227 in contact with the panel support 1010. The finger biasing member 1030 is, in one aspect, a torsion spring 1031 (FIG. 10) and in other aspects a linear tension spring 1032 (FIG. 11); however, in other aspects, the finger biasing member 1030 may be any suitable biasing member such as a leaf spring, a compression spring, or a resilient non-metallic material (e.g., rubber, etc.).

The panel support 1010 and the finger member 1020 form a channel in which the second panel 227 may slide (and pivot when the latch mechanism 310 is released) so that the second-panel inboard end 321 may be moved in directions 840, 841 towards the top 298 of the aircraft 100 (FIG. 2) away from the latch mechanism 310 and then slid out of the slide coupling 320 substantially in direction 1040. The second panel 227 may be manipulated within a crown area 235 of the aircraft 100 to position the second panel 227 in an orientation for removal and passage between the monuments 280-282 and/or luggage compartments 212 (or other obstructions).

In one aspect, a lanyard 390 may also be provided to couple the second panel 227 to the aircraft structure 101. The lanyard 390 may provide restricted or limited movement of the second panel 227 relative to the aircraft structure when the second panel 227 is uncoupled from aircraft structure.

Referring to FIGS. 2, 3, 7, 8A-8C, and 12, an exemplary method of operating an aircraft panel system 219 will be described. The method comprises pressing the free end 711 of the first panel 229 away from the second panel 227 (FIG. 12, Block 1200) in rotation direction 843 so that the first panel 229 pivots from the latched position 800 to the actuation position 801 about the hinged coupling 300 that couples the first panel 229 to the aircraft structure 101. The first panel 229 is disposed adjacent the second panel 227 such that the second panel 227 overlaps the first panel 229. The free end 711 of the first panel 229 comprises the first-panel outboard end 710. The first panel 229 pivots in rotation direction 843 towards a top 298 of an aircraft 100.

The method further comprises actuating the latch mechanism 310 with the first panel 229 to cause a release of the second panel 227 from the latch mechanism 310 (FIG. 12, Block 1201), where when latched the latch mechanism 310 couples the second panel 227 to the aircraft structure 101. Actuating the latch mechanism 310 includes rotating the release arm 731 of the latch mechanism 310 with the cam member 730 of the first panel 229.

The method may further comprise removing the second panel 227 from the slide coupling 320 after the second panel 227 is released from the latch mechanism 310 (FIG. 12, Block 1202). Here, the outboard side of the second panel 227 is removed from the slide coupling 320. The method may also include removing or releasing one or more of a lanyard 390 (that couples the second panel to the aircraft structure 101) and electrical connections 371 (e.g., between an aircraft electrical system 370 and the second panel 227) from the second panel 227 to facilitate the removal of the second panel.

The method further comprises biasing the first panel 229 in the latched position 800 (FIG. 12, Block 1203). Biasing the first panel 229 in the latched position 800 prevents undesired actuation of the latch mechanism 310 and returns the first panel 229 to the latched position 800 from the actuation position 801. In one aspect, pivoting motion of the first panel 229 is dampened (FIG. 12, Block 1204) about the hinged coupling 300 so as to prevent undesired rotation of the first panel 229. An orientation of the latched position 800 of the first panel 229 may be set (FIG. 12, Block 1205) with an over-travel stop 400 coupled to one or more of the first panel 229 and the aircraft structure 101. Setting the latched position 800 of the first panel 229 substantially aligns the display surface 720 (FIG. 7) of adjacent first panels 229 (see FIG. 9) with each other in the common plane 799 (FIG. 7). The second panel 227 may be located in the fore-aft direction of the aircraft 100 with locating members 910 of the latch mechanism 310 (FIG. 12, Block 1206).

The following are provided in accordance with the aspects of the present disclosure:

A1. An aircraft panel system 219 comprising:

a first panel 229 having a hinged coupling 300 configured to couple the first panel 229 to an aircraft structure 101;

a second panel 227 disposed adjacent to the first panel 229 such that the first panel 229 and the second panel 227 together form cabin surface 301 of an aircraft 100; and a latch mechanism 310 configured to releasably couple the second panel 227 to the aircraft structure 101, where the first panel 229 is configured to pivot about the hinged coupling 300 from a latched position 800 to an actuation position 801 to actuate the latch mechanism 310 and cause a release of the second panel 227 from the latch mechanism 310.

A2. The aircraft panel system 219 of paragraph A1, wherein the hinged coupling 300 comprises a panel biasing member 600 that biases the first panel 229 in the latched position 800.

A3. The aircraft panel system 219 of paragraph A1, wherein the first panel 229 comprises a damper 500 configured to dampen pivoting motion of the first panel 229 about the hinged coupling 300.

A4. The aircraft panel system 219 of paragraph A1, wherein the hinged coupling 300 comprises a first leg 601 cantilevered from the aircraft structure 101 and a second leg 602 coupled to a coupling surface 603 of the first panel 229.

A5. The aircraft panel system 219 of paragraph A1, wherein the first panel 229 is cantilevered from the aircraft structure 101 through the hinged coupling 300.

A6. The aircraft panel system 219 of paragraph A1, further comprising an over-travel stop 400 coupled to one or more of the first panel 229 and the aircraft structure 101, the over-travel stop 400 being configured to set an orientation of the latched position 800 of the first panel 229.

A7. The aircraft panel system 219 of paragraph A1, wherein the first panel 229 has a first-panel inboard end 700 adjacent the hinged coupling 300 and a first-panel outboard end 710 adjacent the second panel 227, the first panel 229 being configured such that the first-panel outboard end 710 pivots away from the second panel 227 to actuate the latch mechanism 310.

A8. The aircraft panel system 219 of paragraph A7, wherein the first-panel outboard end 710 of the first panel 229 pivots towards a top 298 of the aircraft 100.

A9. The aircraft panel system 219 of paragraph A1, wherein the second panel 227 extends over a display surface 720 of the first panel 229.

A10. The aircraft panel system 219 of paragraph 1, wherein the latch mechanism 310 comprises:
a first latch portion 810 coupled to the aircraft structure 101 and including a receiver mechanism 811; and
a second latch portion 820 coupled to the second panel 227 and including a striker 830, the receiver mechanism 811 being configured to receive and releasably retain the striker 830 of the second latch portion 820.

A11. The aircraft panel system 219 of paragraph A10, wherein:
the first panel 229 comprises a cam member 730; and
the receiver mechanism 811 comprises a release arm 731, the cam member 730 being configured to actuate the release arm 731 causing the release of the second panel 227 from the latch mechanism 310.

A12. The aircraft panel system 219 of paragraph A11, wherein the release arm 731 is configured to actuate the latch mechanism 310 through a rotation of the release arm 731 by the cam member 730.

A13. The aircraft panel system 219 of paragraph A10, wherein the striker 830 includes locating members 910 that engage the second latch portion 820 to locate the second panel 227 in a fore-aft direction of an aircraft 100.

A14. The aircraft panel system 219 of paragraph A10, wherein the striker 830 has a striker length 920 that is greater than a receiver length 921 of the receiver mechanism 811.

A15. The aircraft panel system 219 of paragraph A1, further comprising a slide coupling 320 wherein second panel 227 has a second-panel inboard end 321 adjacent the first panel 229 and a second-panel outboard end 322 coupled to the aircraft structure 101 by the slide coupling 320.

A16. The aircraft panel system 219 of paragraph A15, wherein the slide coupling 320 comprises:

a base bracket 1000 having a panel support 1010 configured to support the second-panel outboard end 322 of the second panel 227;
a finger member 1020 having a knuckle 1021 pivotally coupled to the base bracket 1000, and a tip 1022 that extends from the knuckle 1021; and
a finger biasing member 1030 coupled to both the base bracket 1000 and the finger member 1020 so as to bias the tip 1022 towards the panel support 1010 and against the second panel 227.

A17. The aircraft panel system 219 of paragraph A1, further comprising a lanyard 390 coupling the second panel 227 to the aircraft structure 101.

B1. An aircraft 100 comprising:
an aircraft cabin 202; and
an aircraft panel system 219 disposed within the aircraft cabin 202, the aircraft panel system 219 having
a first panel 229 having a hinged coupling 300 configured to couple the first panel 229 to an aircraft structure 101,
a second panel 227 disposed adjacent to the first panel 229 such that the first panel 229 and the second panel 227 together form cabin surface 301 of the aircraft 100, and
a latch mechanism 310 configured to releasably couple the second panel 227 to the aircraft structure 101, where the first panel 229 is configured to pivot about the hinged coupling 300 from a latched position 800 to an actuation position 801 to actuate the latch mechanism 310 and cause a release of the second panel 227 from the latch mechanism 310.

B2. The aircraft 100 of paragraph B1, wherein the hinged coupling 300 comprises a panel biasing member 600 that biases the first panel 229 in the latched position 800.

B3. The aircraft 100 of paragraph B1, wherein the first panel 229 comprises a damper 500 configured to dampen pivoting motion of the first panel 229 about the hinged coupling 300.

B4. The aircraft 100 of paragraph B1, wherein the hinged coupling 300 comprises a first leg 601 cantilevered from the aircraft structure 101 and a second leg 602 coupled to a coupling surface 603 of the first panel 229.

B5. The aircraft 100 of paragraph B1, wherein the first panel 229 is cantilevered from the aircraft structure 101 through the hinged coupling 300.

B6. The aircraft 100 of paragraph B1, further comprising an over-travel stop 400 coupled to one or more of the first panel 229 and the aircraft structure 101, the over-travel stop 400 being configured to set an orientation of the latched position 800 of the first panel 229.

B7. The aircraft 100 of paragraph B1, wherein the first panel 229 has a first-panel inboard end 700 adjacent the hinged coupling 300 and a first-panel outboard end 710 adjacent the second panel 227, the first panel 229 being configured such that the first-panel outboard end 710 pivots away from the second panel 227 to actuate the latch mechanism 310.

B8. The aircraft 100 of paragraph B7, wherein the first-panel outboard end 710 of the first panel 229 pivots towards a top 298 of the aircraft 100.

B9. The aircraft 100 of paragraph B1, wherein the second panel 227 extends over a display surface 720 of the first panel 229.

B10. The aircraft 100 of paragraph B1, wherein the latch mechanism 310 comprises:
a first latch portion 810 coupled to the aircraft structure 101 and including a receiver mechanism 811; and
a second latch portion 820 coupled to the second panel 227 and including a striker 830, the receiver mechanism 811 being configured to receive and releasably retain the striker 830 of the second latch portion 820.

B11. The aircraft 100 of paragraph B10, wherein:
the first panel 229 comprises a cam member 730; and
the receiver mechanism 811 comprises a release arm 731, the cam member 730 being configured to actuate the release arm 731 causing the release of the second panel 227 from the latch mechanism 310.

B12. The aircraft 100 of paragraph B11, wherein the release arm 731 is configured to actuate the latch mechanism 310 through a rotation of the release arm 731 by the cam member 730.

B13. The aircraft 100 of paragraph B10, wherein the striker 830 includes locating members 910 that engage the second latch portion 820 to locate the second panel 227 in a fore-aft direction of the aircraft 100.

B14. The aircraft 100 of paragraph B10, wherein the striker 830 has a striker length 920 that is greater than a receiver length 921 of the receiver mechanism 811.

B15. The aircraft 100 of paragraph B1, further comprising a slide coupling 320 wherein second panel 227 has a second-panel inboard end 321 adjacent the first panel 229 and a second-panel outboard end 322 coupled to the aircraft structure 101 by the slide coupling 320.

B16. The aircraft 100 of paragraph B15, wherein the slide coupling 320 comprises:
a base bracket 1000 having a panel support 1010 configured to support the second-panel outboard end 322 of the second panel 227;
a finger member 1020 having a knuckle 1021 pivotally coupled to the base bracket 1000, and a tip 1022 that extends from the knuckle 1021; and
a finger biasing member 1030 coupled to both the base bracket 1000 and the finger member 1020 so as to bias the tip 1022 towards the panel support 1010 and against the second panel 227.

B17. The aircraft 100 of paragraph B1, wherein the first panel 229 comprises a cove panel 380 and the second panel 227 comprises an aisle ceiling panel 381.

B18. The aircraft 100 of paragraph B1, further comprising a lanyard 390 coupling the second panel 227 to the aircraft structure 101.

C1. A method of operating an aircraft panel system 219, the method comprising:
pressing a free end 711 of a first panel 229, that is disposed adjacent a second panel 227 such that the second panel 227 overlaps the first panel 229, away from the second panel 227 so that the first panel 229 pivots from a latched position 800 to an actuation position 801 about a hinged coupling 300 that couples the first panel 229 to an aircraft structure 101; and
actuating a latch mechanism 310 with the first panel 229 to cause a release of the second panel 227 from the latch mechanism 310, where when latched the latch mechanism 310 couples the second panel 227 to the aircraft structure 101.

C2. The method of paragraph C1, further comprising biasing the first panel 229 in the latched position 800.

C3. The method of paragraph C1, further comprising dampening pivoting motion of the first panel 229 about the hinged coupling 300.

C4. The method of paragraph C1, further comprising setting an orientation of the latched position 800 of the first panel 229 with an over-travel stop 400 coupled to one or more of the first panel 229 and the aircraft structure 101.

C5. The method of paragraph C1, wherein the first panel 229 pivots towards a top 298 of an aircraft 100.

C6. The method of paragraph C1, wherein the free end 711 of the first panel 229 comprises a first-panel outboard end 710.

C7. The method of paragraph C1, wherein actuating the latch mechanism 310 includes rotating a release arm 731 of the latch mechanism 310 with a cam member 730 of the first panel 229.

C8. The method of paragraph C1, further comprising locating the second panel 227 in a fore-aft direction of an aircraft 100 with locating members 910 of the latch mechanism 310.

C9. The method of paragraph C1, further comprising removing the second panel 227 from a slide coupling 320 after the second panel 227 is released from the latch mechanism 310.

C10. The method of paragraph C9, wherein an outboard side of the second panel 227 is removed from the slide coupling 320.

C11. The method of paragraph C1, further comprising releasing a lanyard 390 from the second panel 227, where the lanyard 390 couples the second panel 227 to the aircraft structure 101.

C12. The method of paragraph C1, further comprising releasing electrical connections 371 between an aircraft electrical system 370 and the second panel 227.

C13. The method of paragraph C1, wherein the first panel 229 is a cove panel 380 of an aircraft cabin 202.

C14. The method of paragraph C1, wherein the second panel 227 is an aisle ceiling panel 381 of an aircraft cabin 202.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts are described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An aircraft panel system comprising:
   a first panel having a hinged coupling configured to couple the first panel to an aircraft structure;
   a second panel disposed adjacent to the first panel such that the first panel and the second panel together form cabin surface of an aircraft; and
   a latch mechanism configured to releasably couple the second panel to the aircraft structure, where the first panel is configured to pivot about the hinged coupling from a latched position to an actuation position to actuate the latch mechanism and cause a release of the second panel from the latch mechanism.

2. The aircraft panel system of claim 1, wherein the hinged coupling comprises a panel biasing member that biases the first panel in the latched position.

3. The aircraft panel system of claim 1, wherein the first panel comprises a damper configured to dampen pivoting motion of the first panel about the hinged coupling.

4. The aircraft panel system of claim 1, wherein the first panel has a first-panel inboard end adjacent the hinged coupling and a first-panel outboard end adjacent the second panel, the first panel being configured such that the first-panel outboard end pivots away from the second panel to actuate the latch mechanism.

5. The aircraft panel system of claim 1, wherein the latch mechanism comprises:
   a first latch portion coupled to the aircraft structure and including a receiver mechanism; and
   a second latch portion coupled to the second panel and including a striker, the receiver mechanism being configured to receive and releasably retain the striker of the second latch portion.

6. The aircraft panel system of claim 5, wherein:
   the first panel comprises a cam member; and
   the receiver mechanism comprises a release arm, the cam member being configured to actuate the release arm causing the release of the second panel from the latch mechanism.

7. The aircraft panel system of claim 1, further comprising a slide coupling wherein second panel has a second-panel inboard end adjacent the first panel and a second-panel outboard end coupled to the aircraft structure by the slide coupling.

8. An aircraft comprising:

an aircraft cabin; and the aircraft panel system of claim 1 disposed within the aircraft cabin.

9. The aircraft of claim 8, wherein the hinged coupling comprises a panel biasing member that biases the first panel in the latched position.

10. The aircraft of claim 8, wherein the first panel comprises a damper configured to dampen pivoting motion of the first panel about the hinged coupling.

11. The aircraft of claim 8, wherein the latch mechanism comprises:

a first latch portion coupled to the aircraft structure and including a receiver mechanism; and a second latch portion coupled to the second panel and including a striker, the receiver mechanism being configured to receive and releasably retain the striker of the second latch portion.

12. The aircraft of claim 11, wherein:

the first panel comprises a cam member; and the receiver mechanism comprises a release arm, the cam member being configured to actuate the release arm causing the release of the second panel from the latch mechanism.

13. The aircraft of claim 11, wherein the striker includes locating members that engage the second latch portion to locate the second panel in a fore-aft direction of the aircraft.

14. The aircraft of claim 8, further comprising a slide coupling wherein second panel has a second-panel inboard end adjacent the first panel and a second-panel outboard end coupled to the aircraft structure by the slide coupling.

15. The aircraft of claim 14, wherein the slide coupling comprises:

a base bracket having a panel support configured to support the second-panel outboard end of the second panel;

a finger member having a knuckle pivotally coupled to the base bracket, and a tip that extends from the knuckle; and a finger biasing member coupled to both the base bracket and the finger member so as to bias the tip towards the panel support and against the second panel.

16. The aircraft of claim 8, wherein the first panel comprises a cove panel and the second panel comprises an aisle ceiling panel.

17. A method of operating the aircraft panel system of claim 1, the method comprising:

pressing a free end of the first panel, that is disposed adjacent the second panel such that the second panel overlaps the first panel, away from the second panel so that the first panel pivots from the latched position to the actuation position about the hinged coupling that couples the first panel to the aircraft structure; and actuating the latch mechanism with the first panel to cause the release of the second panel from the latch mechanism, where when latched the latch mechanism couples the second panel to the aircraft structure.

18. The method of claim 17, further comprising setting an orientation of the latched position of the first panel with an over-travel stop coupled to one or more of the first panel and the aircraft structure.

19. The method of claim 17, further comprising locating the second panel in a fore-aft direction of an aircraft with locating members of the latch mechanism.

20. The method of claim 17, further comprising removing the second panel from a slide coupling after the second panel is released from the latch mechanism.

* * * * *